(12) United States Patent
Lu

(10) Patent No.: US 10,732,887 B2
(45) Date of Patent: Aug. 4, 2020

(54) CABLE MODEM AND OPERATING METHOD THEREOF

(71) Applicant: PEGATRON CORPORATION, Taipei (TW)

(72) Inventor: Ming-Shien Lu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/198,939

(22) Filed: Nov. 23, 2018

(65) Prior Publication Data

US 2019/0171366 A1 Jun. 6, 2019

(30) Foreign Application Priority Data

Dec. 1, 2017 (TW) .............................. 106142268 A

(51) Int. Cl.
*G06F 3/06* (2006.01)
*G06F 9/44* (2018.01)
*G06F 9/4401* (2018.01)

(52) U.S. Cl.
CPC ............ *G06F 3/065* (2013.01); *G06F 3/0604* (2013.01); *G06F 3/0659* (2013.01); *G06F 3/0679* (2013.01); *G06F 9/4401* (2013.01)

(58) Field of Classification Search
CPC ...................................... G06F 3/06; G06F 9/44
See application file for complete search history.

(56) References Cited

U.S. PATENT DOCUMENTS

| | | | | |
|---|---|---|---|---|
| 9,411,688 B1* | 8/2016 | Poolla | ............... | H03K 19/17764 |
| 9,934,097 B2* | 4/2018 | Tian | ............... | G06F 12/0653 |
| 2004/0268116 A1* | 12/2004 | Vasisht | ............... | G06F 11/1417 |
| | | | | 713/100 |
| 2007/0266202 A1* | 11/2007 | Mukaida | ............... | G06F 9/4401 |
| | | | | 711/103 |
| 2007/0277027 A1* | 11/2007 | Kim | ............... | G06F 9/4401 |
| | | | | 713/1 |
| 2009/0138754 A1* | 5/2009 | Edwards | ............... | G06F 9/4403 |
| | | | | 714/6.11 |
| 2012/0239972 A1* | 9/2012 | Shibata | ............... | G06F 11/1417 |
| | | | | 714/15 |
| 2012/0246384 A1* | 9/2012 | Lin | ............... | G06F 12/0246 |
| | | | | 711/103 |
| 2019/0171366 A1* | 6/2019 | Lu | ............... | G06F 3/0679 |

FOREIGN PATENT DOCUMENTS

| | | |
|---|---|---|
| CN | 104754410 A | 7/2015 |
| TW | 201005643 A | 2/2010 |

* cited by examiner

*Primary Examiner* — David E Martinez
(74) *Attorney, Agent, or Firm* — McClure, Qualey & Rodack, LLP

(57) ABSTRACT

The present disclosure provides a cable modem and an operating method thereof. This method includes steps as follows. After receiving a boot command, it is checked whether a boot data of a main storage area of a flash memory is complete. When the boot data of the main storage area of the flash memory is not complete, a backup data is copied from a backup storage area to overwrite the boot data of the main storage area. Then, the boot data in the main storage area is used to continue the boot process.

8 Claims, 3 Drawing Sheets

CABLE MODEM AND OPERATING METHOD THEREOF

RELATED APPLICATION

This application claims priority to Taiwanese Application Serial Number 106142268, filed Dec. 1, 2017, which is herein incorporated by reference.

BACKGROUND

Technology Field

The present disclosure relates to devices and methods. More particularly, the present disclosure relates to a cable modem and an operating method.

Description of Related Art

A cable modem built on the Broadcom platform uses a block in the NOR flash memory to store a storage user setting, system setting, and system event log, so as to ensure that the data can be retained after the device is rebooted. Due to the characteristics and limitations of the NOR flash memory, for revising data, a whole content in the block is deleted firstly, and then the previously stored data and the data that needs to be revised are re-written in the block.

Currently, only a single one block is used as a means of storing data. During the system is performing data storage to the NOR flash memory, when it happens to encounter a power-off shutdown, some or all of the data may be lost because the action of re-writing data has not been completed. When some of the user data are reset back to the factory settings, a user manually resets the user data anew, thereby resulting in poor user experience. When some system settings are lost, the device may be unusable, and the device may be sent to the factory for processing.

SUMMARY

The following presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In one aspect, the present disclosure is directed to a cable modem and an operating method.

According to one embodiment of the present disclosure, the cable modem includes a flash memory and a processor. The flash memory has a main storage area and a backup storage area. The processor is electrically connected to the flash memory. The processor is configured to check whether a boot data of a main storage area is complete after receiving a boot command, to copy a backup data from a backup storage area to overwrite the boot data of the main storage area when the boot data of the main storage area of the flash memory is not complete, and to use the boot data in the main storage area to continue the boot process.

In one embodiment, the processor checks whether the backup data of the backup storage area is complete when the boot data of the main storage area of the flash memory is complete, and the processor copies the boot data from the main storage area to overwrite the backup data of the backup storage area when the backup data of the backup storage area is not complete.

In one embodiment, the cable modem further comprises a network unit, the processor writes a data to the main storage area according to a data writing request when the network unit receives the data writing request, and then the processor copies the data from the main storage area, and the data is overwritten into the backup storage area.

In one embodiment, the processor is based on a predetermined verification rule to calculate the data corresponding to the data writing request to obtain a first checking code, then the processor is based on the predetermined verification rule to calculate the data of the main storage area to obtain a second checking code after receiving the boot command, and the processor determines that the data of the main storage area is not complete when the first checking code and the second checking code are not matched.

In one embodiment, the flash memory is a NOR flash memory.

According to another embodiment of the present disclosure, an operating method for a cable modem having a flash memory includes steps of: checking whether a boot data of a main storage area of the flash memory is complete after receiving a boot command; copying a backup data from a backup storage area to overwrite the boot data of the main storage area of the flash memory when the boot data of the main storage area of the flash memory is not complete; and using the boot data in the main storage area to continue the boot process.

In one embodiment, the operating method further includes steps of: checking whether the backup data of the backup storage area is complete when the boot data of the main storage area of the flash memory is complete; and copying the boot data from the main storage area to overwrite the backup data of the backup storage area when the backup data of the backup storage area is not complete.

In one embodiment, the operating method further includes steps of: writing a data to the main storage area according to a data writing request when receiving the data writing request; copying the data from the main storage area, and the data is overwritten into the backup storage area.

In one embodiment, the operating method further includes steps of: using a predetermined verification rule to calculate the data corresponding to the data writing request to obtain a first checking code; using the predetermined verification rule to calculate the data of the main storage area to obtain a second checking code after receiving the boot command; and determining that the data of the main storage area is not complete when the first checking code and the second checking code are not matched.

In one embodiment, the flash memory is a NOR flash memory.

In view of the foregoing, the cable modem of the present disclosure has an additionally backup storage area. Any data is written to the originally main storage area and the additionally backup storage area synchronously. Then, while the cable modem is rebooted, it is checked whether an originally stored data is complete. When it is checked that the originally stored data is not complete, the backup data is copied from the backup storage area to overwrite the originally stored data, so as to accomplish the integrity of the data.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
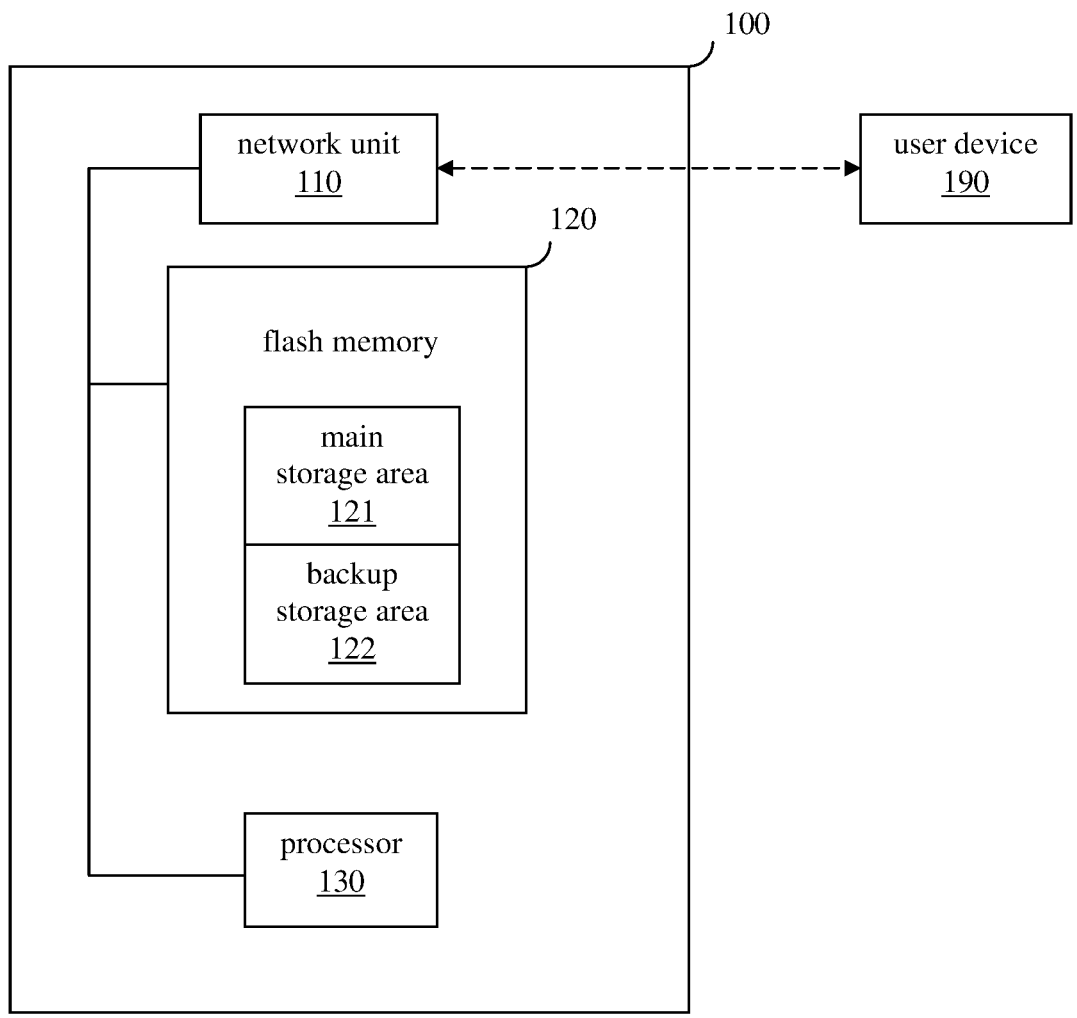
FIG. 1 is a block diagram of a cable modem according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a cable modem 100 according to some embodiments of the present disclosure. As shown in FIG. 1, the cable modem 100 includes a network unit 110, a flash memory 120 and a processor 130. In structure, the processor 130 is electrically connected to the network unit 110 and the flash memory 120.

In practice, the processor 130 may be a microcontroller, a central processing unit, processing circuitry or the like. The network unit 110 may include an interface of a cable television two-way coaxial cable, a wired/wireless transceiver, etc., to establish wired/wireless communication with the user device 190 (e.g., a mobile phone, a computer, etc.). The flash memory 120 may include a NOR flash memory, the read speed of the NOR flash memory that is substantially faster than the read speed of the NAND flash memory, and the NAND flash memory is mainly used to store user settings, system settings, and system execution logs. However, since the writing speed and erasing speed of the NOR flash memory are much slower than that of the NAND flash memory. When the cable modem 100 is powered off, the NOR flash memory is more likely to generate problems of incomplete data. But, the present disclosure is not limited to the NOR flash memory.

In order to solve the problem of incomplete data, the flash memory 120 has not only a main storage area 121 but also a backup storage area 122. In use, the main storage area 121 stores user settings, system settings, and system execution logs. When the user wants to modify the user settings, he or she can use the user device 190 to send a data writing request to the cable modem 100. In the cable modem 100, the network unit 110 receives the data writing request, the processor 130 writes data to the main storage area 121 according to the data writing request, and then the processor 130 copies the data form the main storage area 121, and the data is overwritten into the backup storage area 122. In this way, while the cable modem 100 is rebooted next time, the processor 130 checks the content integrity of the main storage area 121. If any one of the storage areas 121 and 122 has the problem of incomplete data, the error recovery will be performed as described below. In another embodiment, data writing (e.g., automatically updating system settings) can also be executed by the software in the cable modem 100, and is not limited to the modification requested by the user.

Specifically, while the user presses the power button of the cable modem 100 or the cable modem 100 is powered on, after the processor 130 receives a boot command, the processor 130 checks whether a boot data of the main storage area 121 is complete. In one embodiment, the boot data may include user setting and/or system setting. When the boot data of the main storage area 121 of the flash memory 120 is not complete, the processor 130 copies the backup data from the backup storage area 122 to overwrite the boot data of the main storage area 121. In this way, the backup data is copied as a new boot data, and the original incomplete boot data is replaced with the new boot data. After the overwriting is completed, the processor 130 continues the boot process by using the boot data in the main storage area 121. It is assumed that the last time the cable modem 100 was powered off, at this time the data was written into the main storage area 121. Since the backup data of the backup storage area 122 is still complete, the user setting and the system setting can be completely restored.

When the boot data of the main storage area 121 of the flash memory 120 is complete, the processor 130 checks whether the backup data of the backup storage area 122 is complete. When the backup data of the backup storage area 122 is not complete, the processor 130 copies the boot data from the main storage area 121 to overwrite the backup data of the backup storage area 122. In this way, the boot data is copied as a new backup data, and the original incomplete backup data is replaced with the new backup data. It is assumed that the last time the cable modem 100 was powered off, at this time the data was written into the backup storage area 122. Although the backup data of the backup storage area 122 is damaged, the boot data of the main storage area 121 of the flash memory 120 is complete, so that the system can operates in normal.

As to a manner of checking the integrity of the data, in one embodiment, the processor 130 is based on a predetermined verification rule to calculate the data corresponding to the data writing request to obtain a first checking code. Then, the processor 130 is based on the predetermined verification rule to calculate the data of the main storage area 121 to obtain a second checking code after receiving the boot command. When the first checking code and the second checking code are not matched, the processor 130 determines that the data of the main storage area 121 is not complete, and therefore the boot data is not complete. When the first checking code and the second checking code are matched, the processor 130 determines that the data of the main storage area 121 is complete.

Furthermore, the processor 130 is based on the predetermined verification rule to calculate the data of the backup storage area 122 to obtain a third checking code. After determining that the data of the main storage area 121 is complete, when the second checking code and the third checking code are not matched, the processor 130 determines that the data of the backup storage area 122 is not complete, and therefore the backup data is not complete. When the second checking code and the third checking code are not matched, the processor 130 determines that the data of the backup storage area 122 is complete.

For example, the predetermined verification rule may be a checksum, a cyclic redundancy check (CRC), etc., but the present disclosure is not limited thereto.

Figure 2:
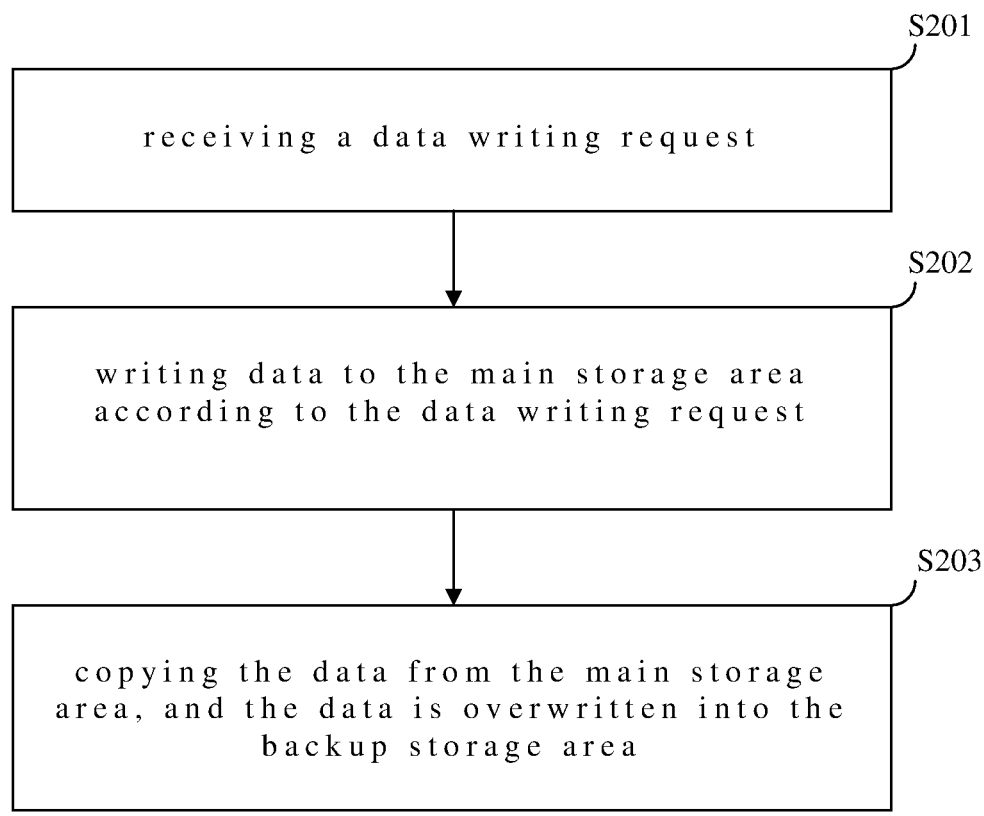
FIG. 2 is a flow chart of an operating method for the cable modem according to some embodiments of the present disclosure.

For a more complete understanding of a method operated by the cable modem 100, referring FIGS. 1-2, FIG. 2 is a flow chart of an operating method 200 for the cable modem 100 according to some embodiments of the present disclosure. As shown in FIG. 2, the operating method 200 includes operations S201, S202 and S203. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

When the user wants to modify the user settings, he or she can use the user device 190 to send a data writing request to the cable modem 100. The cable modem 100 performs the operating method 200. In operation S201, the data writing request is received. In operation S202, data are written to the main storage area 121 according to the data writing request. In operation S203, the data is copied form the main storage area 121, and the data is overwritten into the backup storage area 122. In this way, while the cable modem 100 is rebooted next time, the content integrity of the main storage area 121 can be checked. If any one of the storage areas 121 and 122 has the problem of incomplete data, the error recovery will be performed as described below. In another embodiment, data writing (e.g., automatically updating system settings) can also be executed by the software in the cable modem 100, and is not limited to the modification requested by the user.

Figure 3:
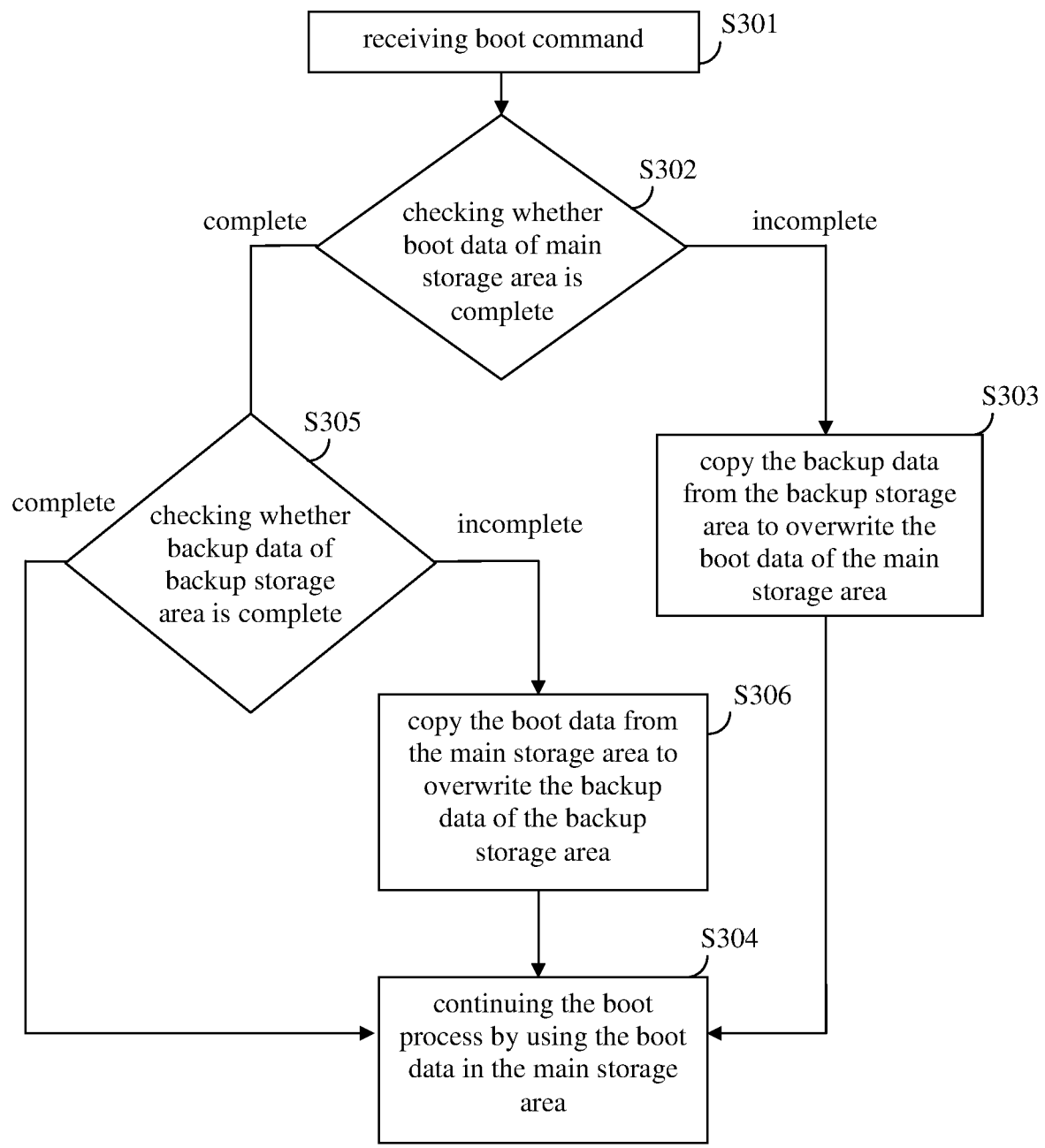
FIG. 3 is a flow chart of an operating method for the cable modem according to some embodiments of the present disclosure.

For a more complete understanding of checking the main storage area 121 and the backup storage area 122, referring FIGS. 1 and 3, FIG. 3 is a flow chart of an operating method 300 for the cable modem 100 according to some embodiments of the present disclosure. As shown in FIG. 3, the operating method 300 includes operations S301, S302, S303, S304, S305 and S306. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

While the user presses the power button of the cable modem 100 or the cable modem 100 is powered on, in operation S301, the cable modem 100 receives a boot command. In operation S302, it is checked whether a boot data of the main storage area 121 is complete. In one embodiment, the boot data may include user setting and/or system setting. When the boot data of the main storage area 121 of the flash memory 120 is not complete, in operation S303, the backup data is copied from the backup storage area 122 to overwrite the boot data of the main storage area 121. In this way, the backup data is copied as a new boot data, and the original incomplete boot data is replaced with the new boot data. After the overwriting is completed, in operation S304, the boot process is continued by using the boot data in the main storage area 121. It is assumed that the last time the cable modem 100 was powered off, during which the data was written into the main storage area 121. Since the backup data of the backup storage area 122 is still complete, the user setting and the system setting can be completely restored by the operating method 300.

When the boot data of the main storage area 121 of the flash memory 120 is complete as checked in operation S302, in operation S305, it is checked whether the backup data of the backup storage area 122 is complete. When the backup data of the backup storage area 122 is not complete, in operation S306, the boot data is copied from the main storage area 121 to overwrite the backup data of the backup storage area 122. In this way, the boot data is copied as a new backup data, and the original incomplete backup data is replaced with the new backup data. Then, in operation S304, the boot process is continued by using the boot data in the main storage area 121. It is assumed that the last time the cable modem 100 was powered off, at this time the data was written into the backup storage area 122. Although the backup data of the backup storage area 122 is damaged, the boot data of the main storage area 121 of the flash memory 120 is complete, so that the system can operates in normal.

When the backup data of the backup storage area 122 is complete as checked in operation S305, in operation S304, the boot process is continued by using the boot data in the main storage area 121.

As to a manner of checking the integrity of the data, referring FIGS. 1-3, in operation S201, the predetermined verification rule is used to calculate the data corresponding to the data writing request to obtain a first checking code. While the cable modem 100 is rebooted next time, in operation S301, the predetermined verification rule is used to calculate the data of the main storage area 121 to obtain a second checking code. When the first checking code and the second checking code are not matched, in operation S301, it is determined that the data of the main storage area 121 is not complete, and therefore the boot data is not complete. When the first checking code and the second checking code are matched, it is determined that the data of the main storage area 121 is complete.

When the data of the main storage area 121 is complete, in operation S305, the predetermined verification rule is used to calculate the data of the backup storage area 122 to obtain a third checking code. After determining that the data of the main storage area 121 is complete, when the second checking code and the third checking code are not matched, in operation S305, it is determined that the data of the backup storage area 122 is not complete, and therefore the backup data is not complete. When the second checking code and the third checking code are not matched, in operation S305, it is determined that the data of the backup storage area 122 is not complete, and therefore the backup data is complete.

In view of the above, the cable modem of the present disclosure has an additionally backup storage area 122 for solving the problem of incomplete data. Any data is written to the originally main storage area 121 and the additionally backup storage area 122 synchronously. Then, while the cable modem 100 is rebooted, it is checked whether an originally stored data is complete. When it is checked that the originally stored data is not complete, the backup data is copied from the backup storage area 122 to overwrite the originally stored data, so as to accomplish the integrity of the data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A cable modem, comprising:
a flash memory having a main storage area and a backup storage area; and
a processor, electrically connected to the flash memory, the processor configured to:
check whether a boot data of the main storage area is complete after receiving a boot command;
copy a backup data from the backup storage area to overwrite the boot data of the main storage area when the boot data of the main storage area of the flash memory is not complete; and
use the boot data in the main storage area to continue the boot process; and
a network unit, the processor writes a data to the main storage area according to a data writing request when the network unit receives the data writing request, and then the processor copies the data from the main storage area, and the data is overwritten into the backup storage area.

2. The cable modem of claim 1, wherein the processor checks whether the backup data of the backup storage area is complete when the boot data of the main storage area of the flash memory is complete, and the processor copies the boot data from the main storage area to overwrite the backup data of the backup storage area when the backup data of the backup storage area is not complete.

3. The cable modem of claim 1, wherein the processor is based on a predetermined verification rule to calculate the data corresponding to the data writing request to obtain a first checking code, then the processor is based on the predetermined verification rule to calculate the data of the main storage area to obtain a second checking code after receiving the boot command, and the processor determines that the data of the main storage area is not complete when the first checking code and the second checking code are not matched.

4. The cable modem of claim 1, wherein the flash memory is a NOR flash memory.

5. An operating method for a cable modem having a flash memory, and the operating method comprising:
checking whether a boot data of a main storage area of the flash memory is complete after receiving a boot command;
copying a backup data from a backup storage area of the flash memory to overwrite the boot data of the main storage area when the boot data of the main storage area of the flash memory is not complete;
using the boot data in the main storage area to continue the boot process;
writing a data to the main storage area according to a data writing request when receiving the data writing request; and
copying the data from the main storage area, and the data is overwritten into the backup storage area.

6. The operating method of claim 5, further comprising:
checking whether the backup data of the backup storage area is complete when the boot data of the main storage area of the flash memory is complete; and
copying the boot data from the main storage area to overwrite the backup data of the backup storage area when the backup data of the backup storage area is not complete.

7. The operating method of claim 5, further comprising:
using a predetermined verification rule to calculate the data corresponding to the data writing request to obtain a first checking code;
using the predetermined verification rule to calculate the data of the main storage area to obtain a second checking code after receiving the boot command; and
determining that the data of the main storage area is not complete when the first checking code and the second checking code are not matched.

8. The operating method of claim 5, wherein the flash memory is a NOR flash memory.

* * * * *